(«12») United States Patent
Sherrets et al.

(10) Patent No.: US 9,224,228 B1
(45) Date of Patent: Dec. 29, 2015

(54) DATA PRESENTATION (71) Applicant: Google Inc., Mountain View, CA (US)

(72) Inventors: Doug Sherrets, San Francisco, CA (US);
Andrew M. Dahley, San Francisco, CA (US);
Noah Levin, San Francisco, CA (US)

(73) Assignee: Google Inc., Mountain View, CA (US)

( * ) Notice: Subject to any disclaimer, the term of this patent is extended or adjusted under 35 U.S.C. 154(b) by 182 days.

(21) Appl. No.: 13/844,666

(22) Filed: Mar. 15, 2013

(51) Int. Cl.
*G09G 5/00* (2006.01)
*G06T 11/60* (2006.01)
*G06F 3/14* (2006.01)

(52) U.S. Cl.
CPC .. *G06T 11/60* (2013.01); *G06F 3/14* (2013.01)

(58) Field of Classification Search
CPC .................................. G06T 11/60; G06F 3/14
USPC ........................................................ 345/625
See application file for complete search history.

(56) References Cited

U.S. PATENT DOCUMENTS

| | | | | |
|---|---|---|---|---|
| 6,850,249 B1* | 2/2005 | Gu | ............................. | 345/623 |
| 7,025,209 B2* | 4/2006 | Hawkins | ...................... | 709/217 |
| 7,293,074 B1* | 11/2007 | Jellinek et al. | ................ | 709/218 |
| 8,107,768 B2* | 1/2012 | Nomoto | ........................ | 382/282 |
| 8,145,995 B2* | 3/2012 | Rohrabaugh et al. | ......... | 715/249 |
| 8,519,971 B1* | 8/2013 | Mackraz | ....................... | 345/173 |
| 2002/0015042 A1* | 2/2002 | Robotham et al. | ............ | 345/581 |
| 2002/0030844 A1* | 3/2002 | Tuli | ............................. | 358/1.15 |
| 2004/0068550 A1* | 4/2004 | Giannetti | ...................... | 709/215 |
| 2005/0195221 A1* | 9/2005 | Berger et al. | ................. | 345/660 |
| 2008/0177994 A1* | 7/2008 | Mayer | ................................. | 713/2 |
| 2009/0177538 A1* | 7/2009 | Brewer et al. | ................... | 705/14 |
| 2010/0194753 A1* | 8/2010 | Robotham et al. | ............ | 345/428 |
| 2011/0283227 A1* | 11/2011 | Moore et al. | ................... | 715/800 |
| 2012/0223934 A1* | 9/2012 | Takami | ......................... | 345/418 |
| 2013/0117658 A1* | 5/2013 | Fidler et al. | ..................... | 715/234 |
| 2013/0271498 A1* | 10/2013 | Poalini et al. | ................. | 345/660 |
| 2014/0189534 A1* | 7/2014 | Liu et al. | ........................ | 715/753 |

* cited by examiner

*Primary Examiner* — Javid A Amini
(74) *Attorney, Agent, or Firm* — Patent Law Works LLP (57) ABSTRACT

A method, computer program product, and computing system for receiving an indication of a user selecting a selected portion of a piece of content for review on a display screen. A determination is made concerning whether the piece of content will fit within the display screen. If the piece of content will not fit within the display screen: a header portion of the piece of content is rendered within an upper portion of the display screen, and the selected portion of the piece of content is rendered within a main portion of the display screen.

21 Claims, 10 Drawing Sheets

DATA PRESENTATION

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

The phrase social network may be used to refer to a group of technologies (e.g. Web-based and mobile technologies) that allow for users to engage in a quasi-real-time, interactive dialogue. For example, the use of such social networking websites have allowed for long lost friends to be reunited, long-distance friendships to be easily maintained, and information to be broadcast to groups of people.

Social networks may allow for the sharing and distribution of data amongst friends, colleagues, and even total strangers. The advent of powerful handheld, electronic devices has enabled the use of social networks on these handheld, electronic devices. Unfortunately, while the use of such handheld device may be convenient, the display screens incorporated into such devices tend to be small and, therefore, cannot display large quantities of data.

SUMMARY OF DISCLOSURE

In one implementation, a computer-implemented method includes receiving an indication of a user selecting a selected portion of a piece of content for review on a display screen. A determination is made concerning whether the piece of content will fit within the display screen. If the piece of content will not fit within the display screen: a header portion of the piece of content is rendered within an upper portion of the display screen, and the selected portion of the piece of content is rendered within a main portion of the display screen.

One or more of the following features may be included. A graphical divider may be rendered between the header portion of the piece of content and the selected portion of the piece of content on the display screen. The graphical divider may simulate a third dimension that extends into the display screen. If the piece of content will fit within the display screen, the piece of content may be rendered within the display screen.

The selected portion of the piece of content may be longitudinally scrolled within the main portion of the display screen in response to a scroll indication from the user. The header portion of the piece of content may remain stationary within the upper portion of the display screen while the selected portion of the piece of content may be longitudinally scrolled within the main portion of the display screen. The display screen may be included within a handheld electronic device.

In another implementation, a computer program product resides on a computer readable medium and has a plurality of instructions stored on it. When executed by a processor, the instructions cause the processor to perform operations including receiving an indication of a user selecting a selected portion of a piece of content for review on a display screen. A determination is made concerning whether the piece of content will fit within the display screen. If the piece of content will not fit within the display screen: a header portion of the piece of content is rendered within an upper portion of the display screen, and the selected portion of the piece of content is rendered within a main portion of the display screen.

One or more of the following features may be included. A graphical divider may be rendered between the header portion of the piece of content and the selected portion of the piece of content on the display screen. The graphical divider may simulate a third dimension that extends into the display screen. If the piece of content will fit within the display screen, the piece of content may be rendered within the display screen.

The selected portion of the piece of content may be longitudinally scrolled within the main portion of the display screen in response to a scroll indication from the user. The header portion of the piece of content may remain stationary within the upper portion of the display screen while the selected portion of the piece of content may be longitudinally scrolled within the main portion of the display screen. The display screen may be included within a handheld electronic device.

In another implementation, a computing system including a processor and memory is configured to perform operations including receiving an indication of a user selecting a selected portion of a piece of content for review on a display screen. A determination is made concerning whether the piece of content will fit within the display screen. If the piece of content will not fit within the display screen: a header portion of the piece of content is rendered within an upper portion of the display screen, and the selected portion of the piece of content is rendered within a main portion of the display screen.

One or more of the following features may be included. A graphical divider may be rendered between the header portion of the piece of content and the selected portion of the piece of content on the display screen. The graphical divider may simulate a third dimension that extends into the display screen. If the piece of content will fit within the display screen, the piece of content may be rendered within the display screen.

The selected portion of the piece of content may be longitudinally scrolled within the main portion of the display screen in response to a scroll indication from the user. The header portion of the piece of content may remain stationary within the upper portion of the display screen while the selected portion of the piece of content may be longitudinally scrolled within the main portion of the display screen. The display screen may be included within a handheld electronic device.

These and other aspects of this disclosure may provide one or more advantages, examples of which may include but are not limited to: providing a consistent look & feel for content regardless of the actual portion of the content that the user is reviewing, and allowing a user to review content without being suddenly thrust into the middle of a long document.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED IMPLEMENTATIONS

Figure 1:
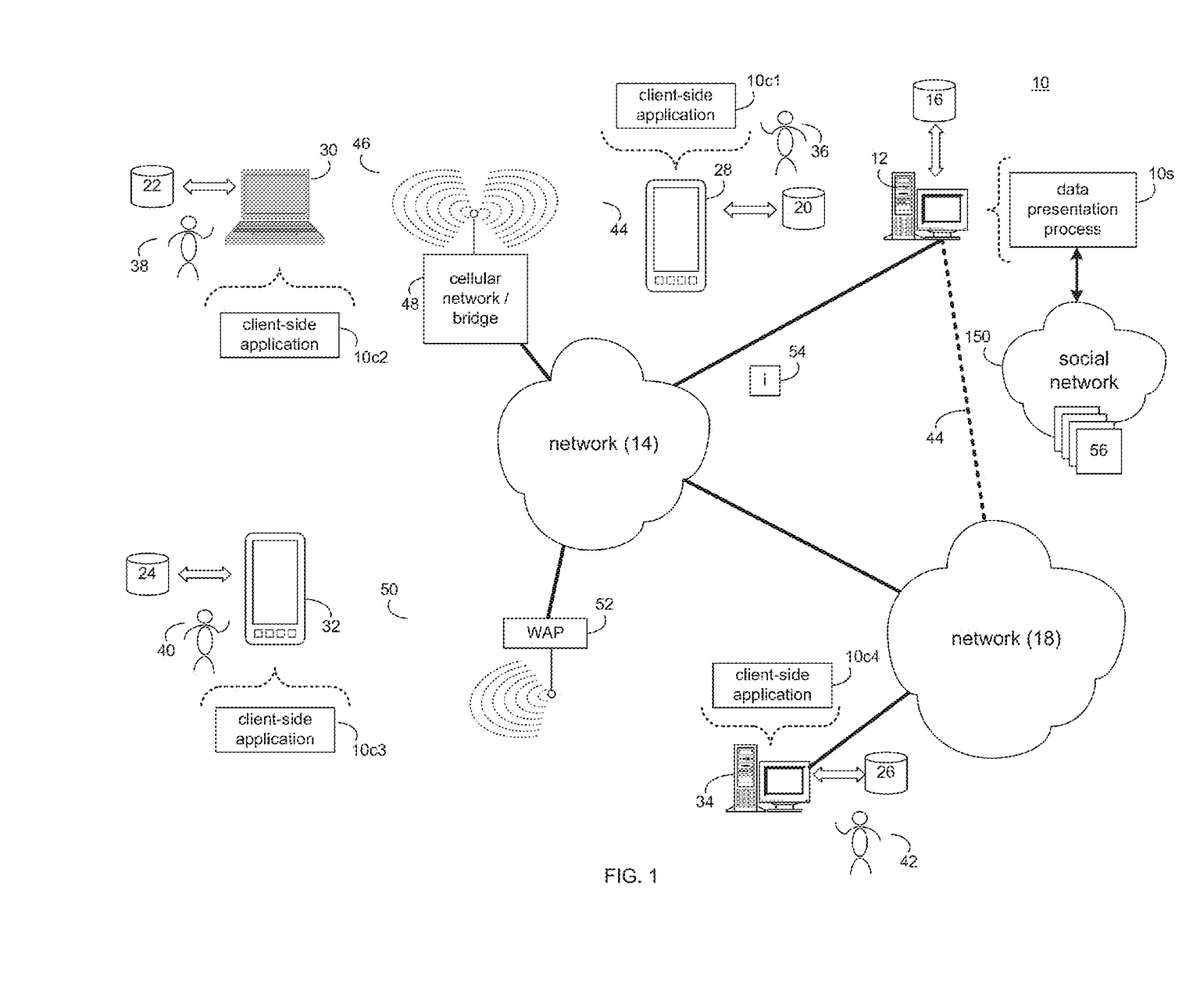
FIG. 1 is a diagrammatic view of a distributed computing network including a computing device that executes an data presentation process according to an implementation of the present disclosure.
Figure 2:
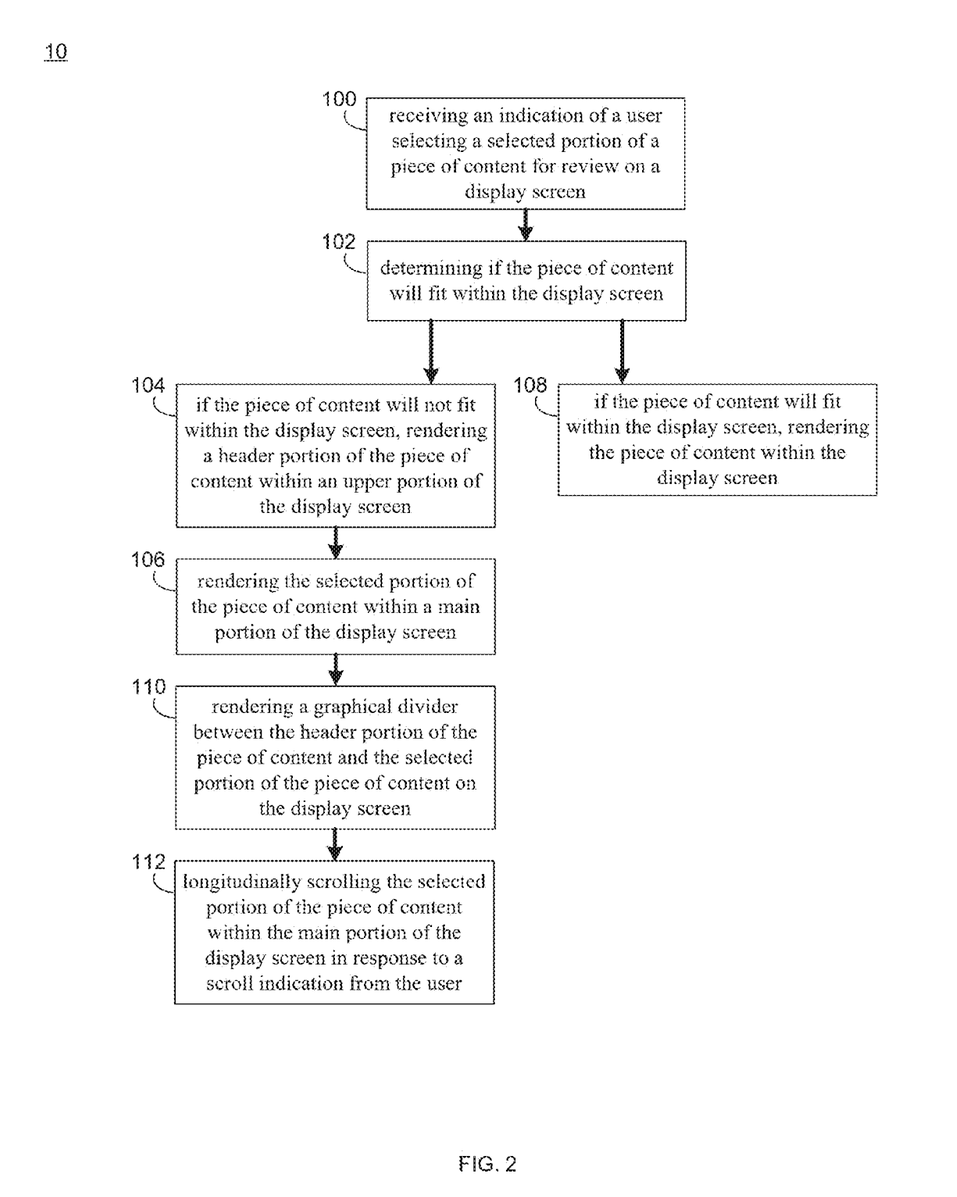
FIG. 2 is a flowchart of the data presentation process of FIG. 1 according to an implementation of the present disclosure.

In FIGS. 1 & 2, there is shown data presentation process 10. Data presentation process 10 may be implemented as a server-side process, a client-side process, or a hybrid server-side/client-side process. For example, data presentation process 10 may be implemented as a purely server-side process via data presentation process 10s. Alternatively, data presentation process 10 may be implemented as a purely client-side process via one or more of client-side application 10c1, client-side application 10c2, client-side application 10c3, and client-side application 10c4. Alternatively still, data presentation process 10 may be implemented as a hybrid server-side/client-side process via data presentation process 10s in combination with one or more of client-side application 10c1, client-side application 10c2, client-side application 10c3, and client-side application 10c4. Accordingly, data presentation process 10 as used in this disclosure may include any combination of data presentation process 10s, client-side application 10c1, client-side application 10c2, client-side application 10c3, and client-side application 10c4.

As will be discussed below in greater detail, Data presentation process 10 may receive 100 an indication of a user selecting a selected portion of a piece of content for review on a display screen. Data presentation process 10 may determine 102 if the piece of content will fit within the display screen. If the piece of content will not fit within the display screen, data presentation process 10 may render 104 a header portion of the piece of content within an upper portion of the display screen, and may render 106 the selected portion of the piece of content within a main portion of the display screen.

Data presentation process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of data presentation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, or a specialized application (e.g., an application running on e.g., the Android™ platform or the iPhone™ platform). The instruction sets and subroutines of client-side applications 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access data presentation process 10 directly through network 14 or through secondary network 18. Further, data presentation process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 3A:
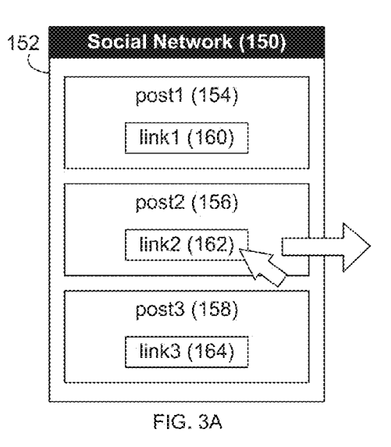
FIGS. 3A-3H are diagrammatic views of a display screen rendered by the data presentation process of FIG. 1 according to an implementation of the present disclosure.

Referring also to FIG. 3A-3E, data presentation process 10 may be included within, executed within, or a portion of a social network (e.g., social network 150). For illustrative purposes, assume that user 36 is reviewing various posts made within social network 150. For example and as shown in FIG. 3A, assume that social network 150 is rendered within display screen 152 of client electronic device 28. Rendered within user interface 152 may be a plurality of posts (e.g. post 154, 156, 158), wherein each post may include a link (e.g. links 160, 162, 164) to remote material. For example, post 154 may discuss a sports article pointed to by link 160; post 156 may discuss a concert review pointed to by link 162; and post 158 may concern a restaurant review pointed to by link 164.

Figure 3B:
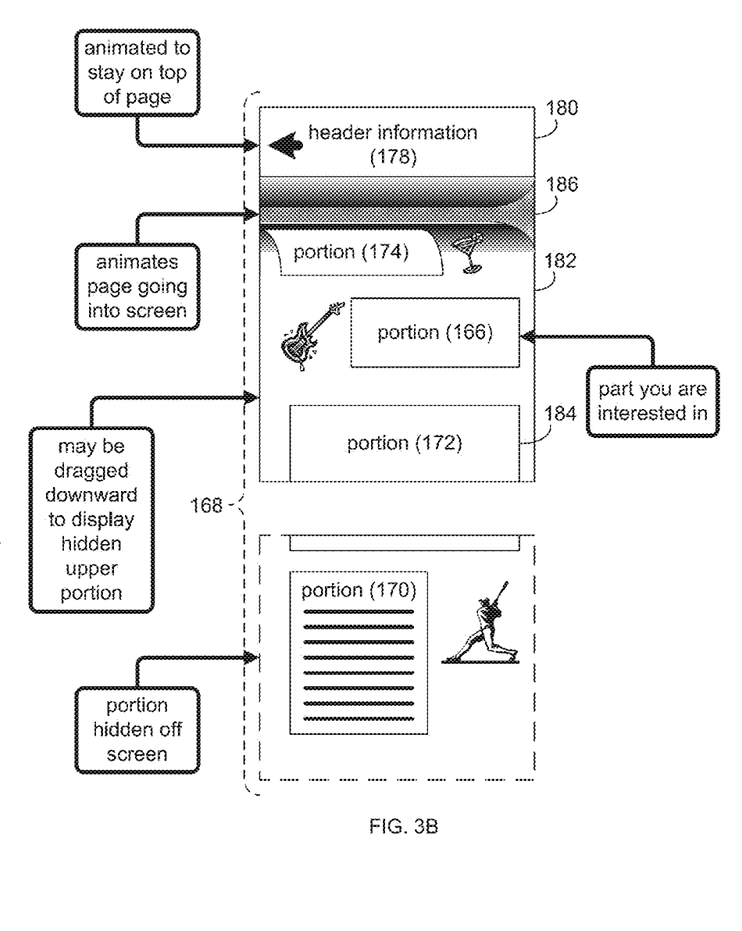
Figure 3C:
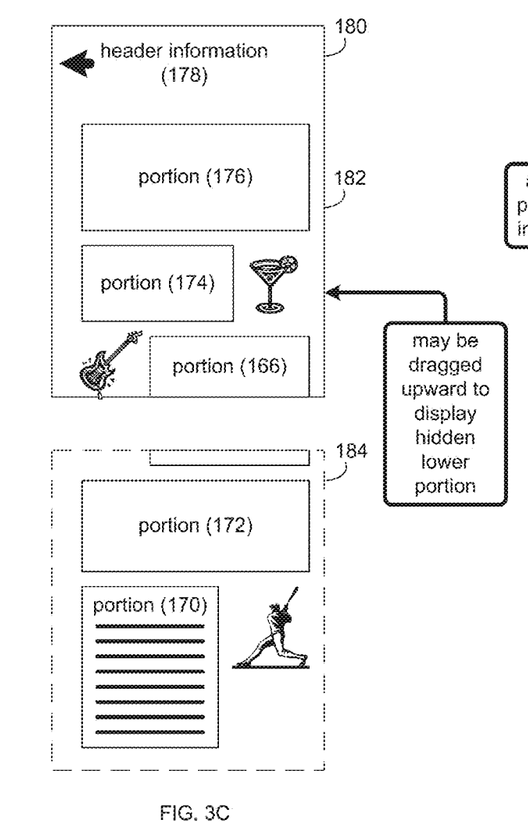

Assume for illustrative purposes that user 36 is interested in post 156 (which concerns the concert review) and selects link 162 (e.g. by tapping on link 162 within display screen 152 of client electronic device 28). For illustrative purposes, assume that the concert review pointed to by link 162 is a small portion (e.g. portion 166) of a larger piece of content (e.g. content 168), which may include other topics/articles (in addition to portion 166 (e.g. concert review) discussed within post 156). For example, content 168 may include portion 170 that discusses a baseball game, portion 172 that discusses a newly-released movie, portion 174 that discusses a new nightclub, and portion 176 that discusses a new amusement park (as shown in FIGS. 3B & 3C).

Upon user 36 selecting link 162, data presentation process 10 may receive 100 an indication (e.g. selection indication 54) of a user (e.g. user 36) selecting a selected portion (e.g. portion 166) of a piece of content (e.g. content 168) for review on display screen 152 of client electronic device 28.

Upon receiving 100 indication 54, data presentation process 10 may determine 102 if the piece of content (e.g. content 168) will fit within display screen 152. If it is determined 102 that the piece of content (e.g. content 168) will fit within display screen 152, data presentation process 10 may render 108 the piece of content (e.g. content 168) within display screen 152.

For example, if content 168 is comparatively small, data presentation process 10 may be able to render content 168 (in its entirety) within the area of display screen 152. Accordingly, user 36 would be able to review content 168 (in its entirety) without needing to scroll upward or downward to see the portions of content 168 that were off the screen.

If it is determined 102 that the piece of content (e.g. content 168) will not fit within display screen 152: data presentation process 10 may render 104 a header portion (e.g. header 178) of the piece of content (e.g. content 168) within an upper portion (e.g. upper portion 180) of display screen 152, and may render 106 the selected portion (e.g. portion 166) of the piece of content (e.g. content 168) within a main portion (e.g. main portion 182) of display screen 152.

For example, if content 168 is considerably long, data presentation process 10 may not be able to render content 168 (in its entirety) within the area of display screen 152. Assume for illustrative purposes that content 168 is a multi-topic weblog. Accordingly, data presentation process may render 104 header 178 (e.g. the title bar of the multi-topic weblog) within upper portion 180 of display screen 152. Further, in main portion 182 of display screen 152, data presentation process 10 may render 106 portion 166 of content 168. While in this particular illustration, portion 166 of content 168 is shown to be considerably smaller in size, thus enabling portion 166 of content 168 to be rendered 106 (in its entirety) within main portion 182 of display screen 152, this is for illustrative purposes only and is not intended to be a limitation of this disclosure. For example, in the event that portion 166 for content 168 is considerably large, only the introductory section a portion 166 may be rendered 106 (in its entirety) within main portion 182 of display screen 152, wherein the remainder of portion 166 may be off screen (e.g. in off screen portion 184).

Data presentation process 10 may render 110 a graphical divider (e.g. graphical divider 186) between the header portion (e.g. header 178) of the piece of content (e.g. content 168) and the selected portion (e.g. portion 166) of the piece of content (e.g. content 168 on display screen 152.

Graphical divider 186 may configured to simulate a third dimension that extends into display screen 152. For example, graphical divider 186 may be configured so that it appears that the lower region of header 178 rolls inward (into display screen 152) and the upper region of portion 166 rolls inward (into display screen 152). Accordingly and referring to FIGS. 3B & 3C, content 168 may be thought of as a continuous piece of content that begins with header 178 and ends with portion 170, wherein graphical divider 186 represents a break in the continuity of content 168 (such that the upper region of portion 174 appears to roll inward into display screen 152. Further, as content 168 is considerably large, a portion of content 168 (namely some of portion 172 and all of portion 170) are not visible within display screen 152 (and are represented within off screen portion 184).

Data presentation process 10 may be configured to allow e.g. user 36 to longitudinally scroll 112 the selected portion (e.g. portion 166) of the piece of content (e.g. content 168) within the main portion (e.g. main portion 182) of display screen 152 in response to a scroll indication from user 36.

For example, in the event that user 36 wishes to review portion 176 of content 168, user 36 may scroll downward (e.g. by swiping their finger in a downward direction within display screen 152) so that portion 174 of content 168 is no longer partially skewed (within graphical divider 186) and portion 176 of content 168 is no longer hidden (by graphical divider 186) and comes into full view. As portion 176 of content 168 is the uppermost portion of content 168, upon portion 176 being viewable within main portion 182 of display screen 152, graphical divider 186 may disappear as there is no longer a disconnect between header 178 and portion 176 of content 168 (as shown in FIG. 3C).

The header portion (e.g. header 178) of the piece of content (e.g. content 168) may remain stationary within upper portion 180 of display screen 152 while the selected portion (e.g. portion 166) of the piece of content (e.g. content 168) is longitudinally scrolled 112 within main portion 182 of display screen 152.

Accordingly, as user 36 scrolls portion 166 of content 168 downward to allow for the review of portion 176 of content 168, header 178 (viewable within upper portion 180 of display screen 152) may remain stationary, thus providing user 36 with a consistent look and feel regardless of the specific portion of content 168 that they are reviewing.

Figure 3D:
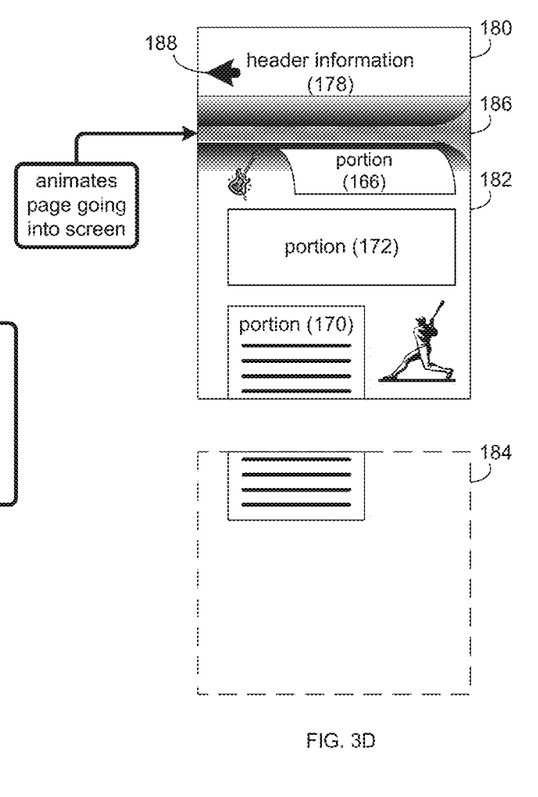

In the event that user 36 wishes to review portion 170 of content 168, user 36 may scroll upward (e.g. by swiping their finger in a upward direction within display screen 152) so that portion 170 of content 168 is no longer positioned within off screen portion 184 and comes into view within display screen 152 (as shown in FIG. 3D). Graphical divider 186 may be configured so that, in the event that user 36 taps or pinches graphical divider 186, the portions of content 168 hidden by graphical divider 186 may reappear (thus resulting in the format shown in FIG. 3C).

Figure 3E:
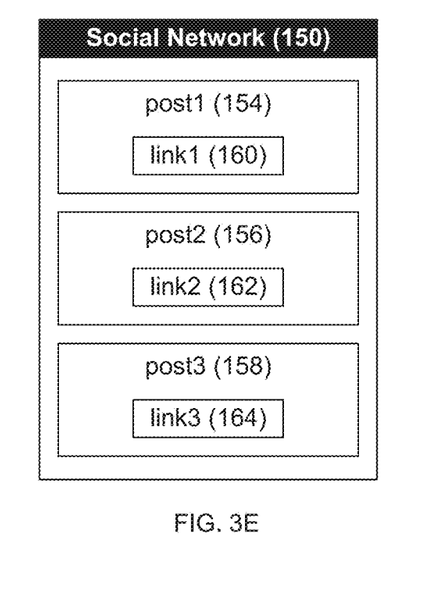

In the event that user 36 wishes to return to social network 150 (e.g. and leave content 168), user 36 may select return arrow 188 and, thus, return to social network 150 (as shown in FIG. 3E).

Figure 3F:
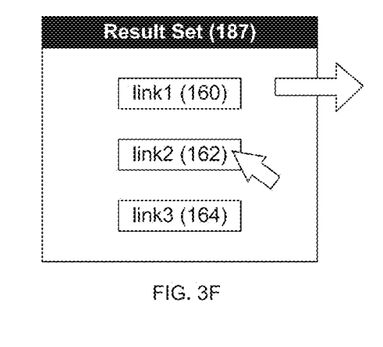

While the system is described above as allowing user 38 to select from a plurality of posts (e.g. post 154, 156, 158) within social network 150 to render content (e.g. content 168) within display screen 152, this is for illustrative purposes only and is not intended to be a limitation of this disclosure. For example and referring also to FIG. 3F, search result set 187 may be generated via a search engine (not shown) utilized by user 38 to execute a query. Search result set 187 may include a plurality of links (e.g. links 160, 162, 164) to identify pieces of content related to the query. Accordingly, content 168 may be identified by e.g., link 162 and, therefore, upon user 38 selecting link 162, content 168 may be rendered in the fashion shown in FIG. 3B.

While the above-described implementation is shown to include only one graphical divider (i.e., graphical divider 186), this is for illustrative purposes only and is not intended to be a limitation of this disclosure, as other configurations are possible. For example and referring also to FIG. 3G, additional graphical dividers (e.g., graphical divider 190) may be utilized to represent additional breaks in the continuity of content 168. For example, a user might search for "best steak in Omaha," and the top result might be an article about the top restaurants in Omaha (which is 10 pages long). Data presentation process 10 may divide this article into multiple sections that each focus on different parts of the article. Scrolling through the article without tapping to expand any part of the article may show that there are additional sections found within the article that focus on steak.

Figure 3G:
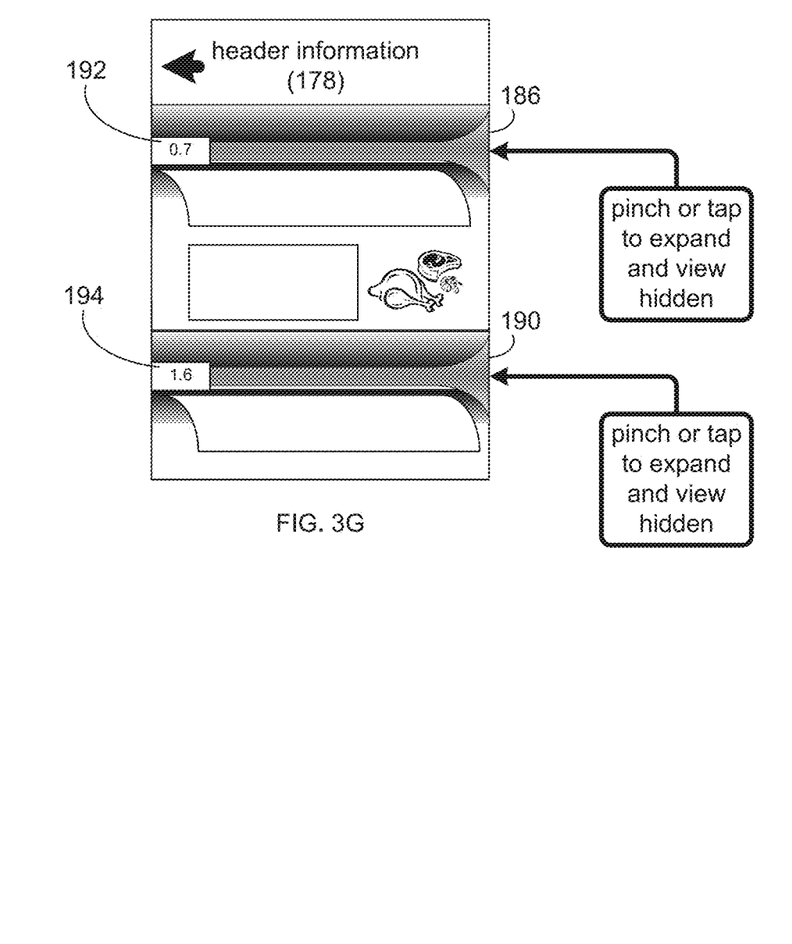

Accordingly, multiple graphical dividers may appear for the portion of content viewable on display screen 152. Further, scrolling may show more graphical dividers until the bottom of content 168 is displayed.

As discussed above, the above-described graphical dividers (i.e., graphical dividers 186, 190) represent breaks in the continuity of content 168. Data presentation process 10 may be configured to provide the user with a visual indicator (e.g., indicators 192, 194) indicative of the size of the break in continuity of content 168. For example, indicator 192 may indicate that graphical divider 186 is obscuring 0.7 screens of content and indicator 194 may indicate that graphical divider 190 is obscuring 1.6 screens of content. Alternatively, indicators 192, 194 may indicate the number of words obscured by graphical dividers 186, 190.

Data presentation process 10 may determine that certain parts of content 168 may be relevant/interesting to user 36 based upon e.g., the content of post 156. Accordingly, data presentation process 10 may identify portions of content 168 that user 36 may wish to jump to (based on e.g., ranking) Data presentation process 10 may provide a visual way to represent the portion(s) of content 168 considered relevant/interesting to user 36 and allow user 36 to navigate those portions of content 168. Further, data presentation process 10 may allow user 36 to jump to multiple portions of content 168 at once by using graphical dividers (e.g., graphical dividers 186, 190) that allow multiple portions of content 168 to be viewable within display screen 152.

For example, assume that a post within social network 150 (made by a friend of user 36) includes the text "this bridge is amazing" and also includes a link to a related article (e.g., content 168). Upon clinking on this link and being directed to that article (e.g., content 168), certain portions of content 168 may be considered by data presentation process 10 to be potentially relevant/interesting to user 36. Assume that content 168 is considerably long and contains twenty different portions. Further, assume that one of those twenty portions concerns the specific bridge referenced in the post. Further assume that six additional portions of the twenty portions concern other bridges, and the remaining thirteen portions have nothing to do with bridges. Accordingly, data presentation process 10 may link to the portion of content 168 identified by the above-described link. Further, one or more graphical dividers (e.g., graphical dividers 186, 190) may be provided by data presentation process 10 to allow user 36 to easily navigate to the six other portions of content 168 that concern bridges. Alternatively/additionally, when determining which other portions of content 168 user 36 may deem relevant/interesting, data presentation process 10 may consider e.g., the likes/dislikes/interests of user 36, the likes/dislikes/interests of friends of user 36, and social affinity.

Data presentation process 10 may also apply the above-described methodologies when e.g., a user selects content from a social network feed when viewing those pages (e.g., clicking and jumping to a part of the page the a friend had scrolled to, linked directly to, automatically determined is the most interesting part of an article and/or is most relevant to the context of the post text provided by the user. For example, a user may scroll three pages to a beautiful photo of the Colorado Mountains. This user may then choose to share this photo. Another user viewing the link (that the above-described user shared) may click on that link and the photo of the Colorado Mountains may appear in the display area with a graphical divider (e.g., graphical divider 186) above it and the webpage header at the top. Graphical dividers (e.g., graphical dividers 186, 190) may appear until the bottom of content 168.

Figure 3H:
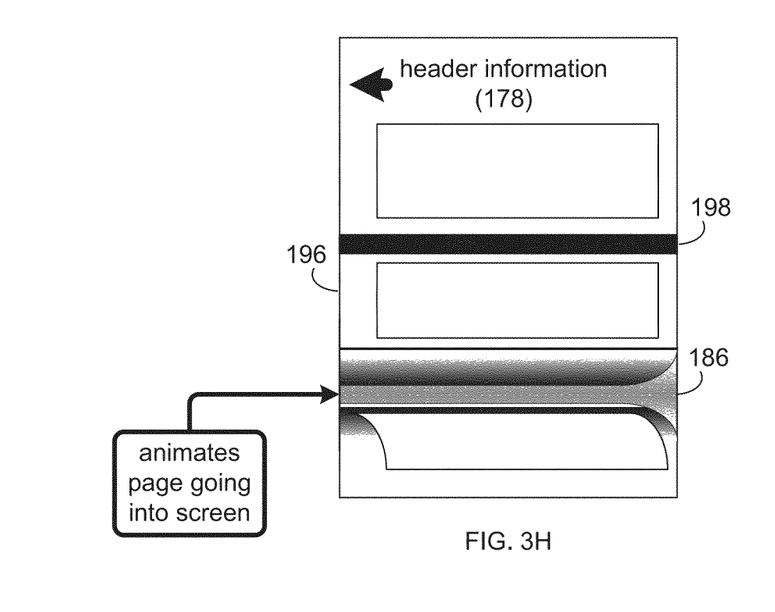

Further and as shown in FIG. 3H, graphical dividers may continue to be shown for e.g., continued scrolling that may span multiple webpages on e.g., the same website or across multiple search results.

For example, user 36 may search for "user experience design tutorials" and a number of search results may appear. User 36 may select the first search result, graphical dividers may be rendered for the content (in the manner described above). User 36 may then continue to scroll and may see e.g., additional webpages (from the same website) that were deemed relevant by data presentation process 10 (based upon the search entered by user 36). Additional graphical dividers may be utilized as needed.

When visiting a link from a social network, if user 36 continues to scroll, the next webpage (e.g., webpage 196) on the website may be shown, separated from the original webpage by divider 198. Webpage 196 may be deemed relevant/interesting by data presentation process 10 depending upon the context of the comment(s) on the link (or based upon what the user might find interesting).

For example, clicking on a link shared by a friend about the movie set for the movie "The Hobbit" may show the page from the link, and may then show another page on that website related to "The Hobbit". Alternatively, the next page shown may be the next link as determined by data presentation process 10 based upon the stream ranking order shared by a user on the social network (such as by a different friend or the prior link shared by that particular user).

The above-described design may appear upon page load. Alternatively, the page may load with the traditional design and then data presentation process 10 may render an animation that e.g., may roll the paper like a scroll to reveal the above-described design. Accordingly, the user may learn what the viewable page looks like and may then see what content is believed to be most interesting/relevant for the user.

Figure 4A:
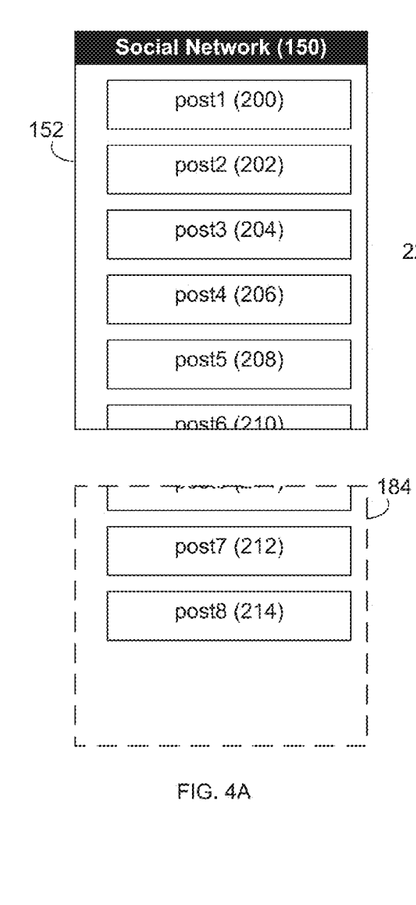
FIGS. 4A-4B are diagrammatic views of a display screen rendered by the data presentation process of FIG. 1 according to an implementation of the present disclosure.
Figure 4B:
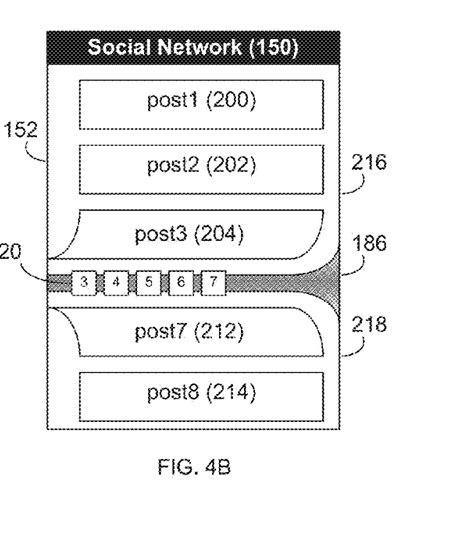

While data presentation process 10 is described above as being configured to work with content 168, this is for illustrative purposes only and is not intended to be a limitation of this disclosure. For example, data presentation process 10 may be configured to work with posts within the social network (e.g. social network 150). Referring also to FIG. 4A-4B and as discussed above, social network 150 may include a plurality of posts (e.g. posts 200, 202, 204, 206, 208, 210, 212, 214) that user 36 may review.

Unfortunately, the quantity of posts within a social network may be overwhelming and may require user 36 to scroll considerably to see the last post (e.g. post 214). Accordingly, data presentation process 10 may be configured to utilize graphical divider 186 to partition display screen 152 into upper portion 216 and lower portion 218 so that the first post (e.g. post 200) and the last post (e.g. post 214) are simultaneously visible within display screen 152. Graphical divider 186 may be configured to illustrate (e.g. through indicators 220) which posts are hidden due to the use of graphical divider 186. For example, indicators 220 illustrate that posts4-post6 (e.g. post 206, post 208, post 210) are hidden by graphical divider 186. Graphical divider 186 may be configured so that, in the event that user 36 taps or pinches graphical divider 186, the post hidden by graphical divider 186 may reappear (thus resulting in the format shown in FIG. 4A).

Figure 5A:
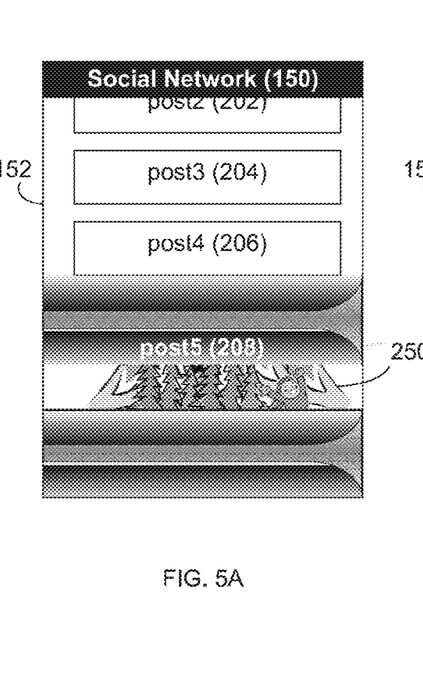
FIGS. 5A-5C are diagrammatic views of a display screen rendered by the data presentation process of FIG. 1 according to an implementation of the present disclosure.
Figure 5B:
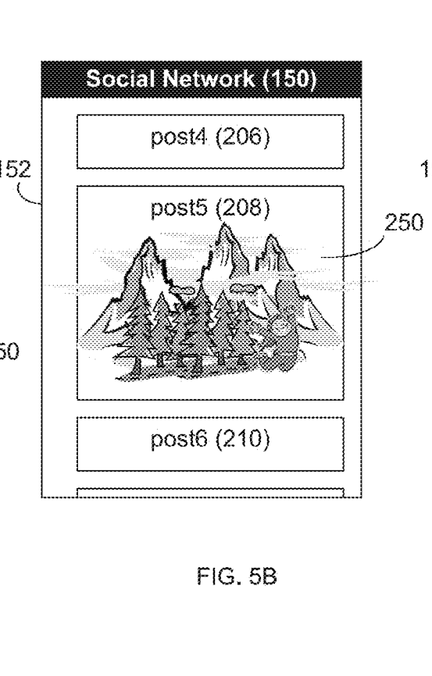
Figure 5C:
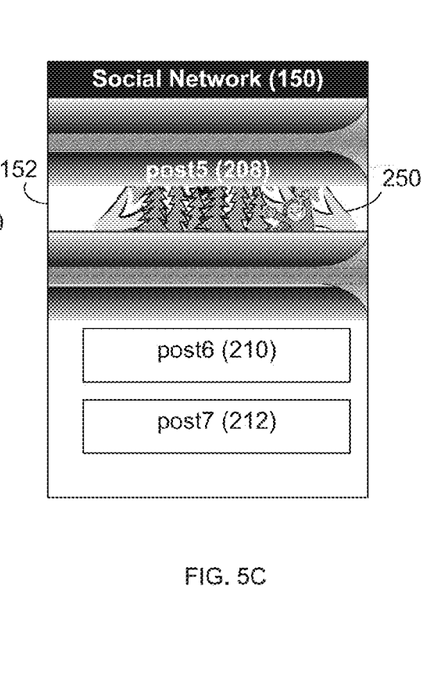

Further, data presentation process 10 may be configured to perform single axis compression/cropping of posts (or portions of posts) to longitudinally compress/crop a series of posts within social network 150. Referring also to FIGS. 5A-5C, assume for illustrative purposes that social network 150 includes a plurality of posts (e.g. posts 202, 204, 206, 208, 210, 212) that user 36 may review. Further, assume that one or more of the posts (e.g. post 208) includes a photograph (e.g. photograph 250). Data presentation process 10 may be configured to longitudinally crop photograph 250 so that more posts are visible within display screen 152. Additionally, when cropping photograph 250, data presentation process 10 may focus on the interesting part of the photograph. For example, facial recognition technology may be utilized to identify a face within photograph 250 and highlight the face when in cropped form. Accordingly, when user 36 is reviewing the posts included within social network 150, user 36 may scroll upward to see additional posts and to view the bottom of display screen 152. Accordingly, when post 208 comes into view within display screen 152, photograph 250 may be cropped along the direction that the posts are being scrolled (as shown in FIG. 5A), with the facial portion of photograph 250 being made prominent by data presentation process 10. One or more graphical dividers (such as those described above) may be rendered by data presentation process 10 to illustrate that an upper portion and/or a lower portion of photograph 250 are obscured through (in this example) cropping. Further, as user 36 continues to scroll the post upward, photograph 250 will no longer be cropped along the direction that the posts are being scrolled (as shown in FIG. 5B) and will be brought into full view (including non-facial features such as the mountains in the background). Further, as post 208 continues to move upward and begins to disappear off of the top of display screen 152, photograph 250 will once again be cropped along the direction that the posts are being scrolled (as shown in FIG. 5C), with the facial portion of photograph 250 once again being made prominent by data presentation process 10. Again, one or more graphical dividers (such as those described above) may be rendered by data presentation process 10 to illustrate that an upper portion and/or a lower portion of photograph 250 are obscured through (in this example) cropping.

While FIGS. 5A-5C illustrate photograph 250 being cropped, this is for illustrative purposes only and is not intended to be a limitation of this disclosure as other configurations are possible. For example, photograph 250 may simply be compressed along a single axis (e.g., along the direction that the posts are being scrolled), resulting in all of photograph 250 still being visible even when in a compressed form.

Figure 6:
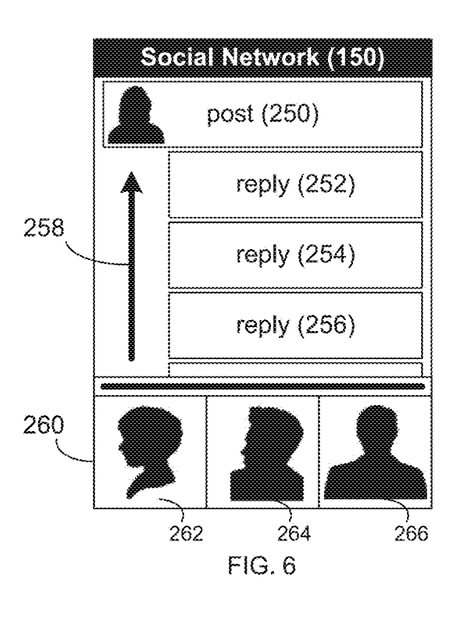
FIG. 6 is a diagrammatic view of a display screen rendered by the data presentation process of FIG. 1 according to an implementation of the present disclosure.

Referring also to FIG. 6, data presentation process 10 may be configured to allow for easier navigation of posts within social network 150. As discussed above, social network 150 may include a plurality of posts (e.g. post 250). Further, one or more users (e.g. users 38, 40, 42) may generate one or more replies (e.g. replies 252, 254, 256) in response to post 250. Unfortunately, sometimes the quantity of replies to a single post may be quite large. Accordingly, if user 36 is scrolling (in the direction of arrow 258) through the posts within social network 150, user 36 will be required to scroll through a large quantity of replies prior to getting to the next post. Accordingly, data presentation process 10 may render preview bar 260 that (in this particular implementation) provides shortcuts to upcoming posts. For example, shortcut 262 may be linked to the next post (e.g. a post by user 38) within social network 150, shortcut 264 may be linked to a post by user 40 that follows the post by user 38, and shortcut 266 may be linked to a post by user 42 that follows the post by user 40. Accordingly, user 36 may select any of shortcuts 262, 264, 266 to jump to the post to which they are linked.

While preview bar 260 is described above as containing shortcuts to upcoming posts, this is for illustrative purposes only and is not intended to be a limitation disclosure, as other configurations are possible. For example, instead of scrolling through posts, user 36 may be scrolling through the text of an e-book. Accordingly, preview bar 260 may contain shortcuts to upcoming chapters within the e-book.

Figure 7:
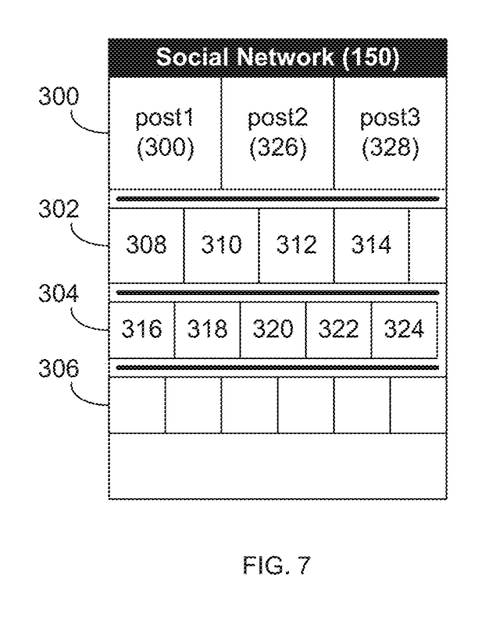
FIG. 7 is a diagrammatic view of a display screen rendered by the data presentation process of FIG. 1 according to an implementation of the present disclosure.

Referring also to FIG. 7, data presentation process 10 may be configured to visually prioritize content within social network 150. Specifically, content may be separated into a plurality of rows (e.g., rows 300, 302, 304, 306), wherein the relevancy of a row of content (with respect to row 300) decreases the further away that the row is positioned from row 300. For example, assume that post 300 is being reviewed by user 36, was made by user 42, and concerns a photograph of Ocean Beach in San Francisco.

Row 302 may contain posts that are deemed highly related/relevant to post 300. The manner in which the posts contained within row 302 are deemed highly related/relevant may be based upon a variety of topics, example of which may include (but are not limited to) social affinity/content/location. For example, row 302 may contain: post 308 (e.g. another post by user 42); post 310 (e.g., a post by user 40 who is a friend of user 36): post 312 (e.g., a post by a third party that links to an article concerning Ocean Beach in San Francisco); and post 314 (e.g., a post by a third party that contains a photograph of Ocean Beach in San Francisco).

Row 304 may contain posts that are deemed moderately related/relevant to post 300. For example, row 304 may contain posts (e.g., post 316, 318, 320) that concern a beach, but not Ocean Beach in San Francisco. Additionally, row 304 may contain posts (e.g., posts 322, 324) that have higher degrees of separation (e.g., posts by friends of friends of user 36).

Row 306 may contain posts that are deemed slightly related/relevant to post 300. For example, row 306 may contain posts that are more topically distant (e.g., restaurants in San Jose) that do not concern beaches or San Francisco but are geographically proximate. Further, row 306 may contain posts that are more socially distant (e.g., posts by a friend of a friend of user 36).

As rows 302, 304, 306 are related to row 300, when user 36 selects a different post within row 300 (e.g., selects post 326 or post 328), the posts included within rows 302, 304, 306 may change. Accordingly, upon e.g., user 36 selecting a different post within row 300, data presentation process 10 may re-render rows 302, 304, 306 so that these rows include posts that are related/relevant to the newly-selected post within row 300 (in the manner discussed above).

Figure 8:
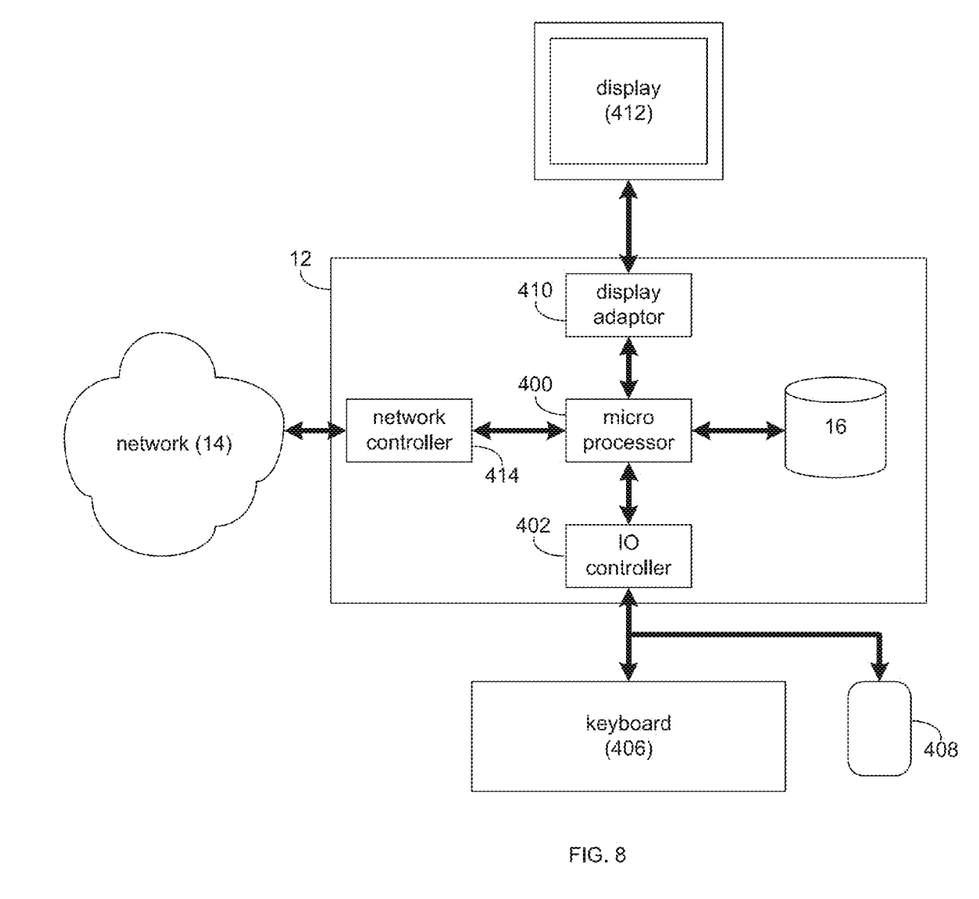
FIG. 8 is a diagrammatic view of the computing device of FIG. 1 according to an implementation of the present disclosure.

Referring also to FIG. 8, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, data presentation process 10 may be substituted for computing device 12 within FIG. 8, examples of which may include but are not limited to client electronic devices 28, 30, 32, 34.

Computing system 12 may include microprocessor 400 configured to e.g., process data and execute instructions/code for data presentation process 10. Microprocessor 400 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 402 may be configured to couple microprocessor 400 with various devices, such as keyboard 406, mouse 408, USB ports (not shown), and printer ports (not shown). Display adaptor 410 may be configured to couple display 412 (e.g., a CRT or LCD monitor) with microprocessor 400, while network adapter 414 (e.g., an Ethernet adapter) may be configured to couple microprocessor 400 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 400) of a general purpose computer/special purpose computer/other programmable data processing apparatus (e.g., computing device 12), such that the instructions, which execute via the processor (e.g., processor 400) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The implementation was chosen and described in order to best explain the principles of the disclosure and the practical application, and to enable others of ordinary skill in the art to understand the disclosure for various implementations with various modifications as are suited to the particular use contemplated.

Having thus described the disclosure of the present application in detail and by reference to implementations thereof, it will be apparent that modifications and variations are possible without departing from the scope of the disclosure defined in the appended claims.

What is claimed is:

1. A computer-implemented method comprising: receiving an indication of a user selecting a piece of content for review on a display screen; determining if the piece of content will fit within the display screen; responsive to a determination that the piece of content will not fit within the display screen, performing: rendering a header portion of the piece of content within an upper portion of the display screen, determining which portions of the piece of content are interesting to the user, ranking the portions of the piece of content based on an interaction of the user with content, determining a selected portion of the ranked portions based on the ranking, and rendering the selected portion of the piece of content within a main portion of the display screen.

2. The computer-implemented method of claim 1 further comprising:
rendering a graphical divider between the header portion of the piece of content and the selected portion of the piece of content on the display screen.

3. The computer-implemented method of claim 2 wherein the graphical divider simulates a third dimension that extends into the display screen.

4. The computer-implemented method of claim 1 further comprising:
responsive to a determination that the piece of content will fit within the display screen, rendering the piece of content within the display screen.

5. The computer-implemented method of claim 1 further comprising:
longitudinally scrolling the selected portion of the piece of content within the main portion of the display screen in response to a scroll indication from the user.

6. The computer-implemented method of claim 5 wherein the header portion of the piece of content remains stationary within the upper portion of the display screen while the selected portion of the piece of content is longitudinally scrolled within the main portion of the display screen.

7. The computer-implemented method of claim 1 wherein the display screen is included within a handheld electronic device.

8. A computer program product residing on a non-transitory computer readable medium having a plurality of instructions stored thereon which, when executed by a processor, cause the processor to perform operations comprising: receiving an indication of a user selecting a piece of content for review on a display screen; determining if the piece of content will fit within the display screen; responsive to a determination that the piece of content will not fit within the display screen, performing: rendering a header portion of the piece of content within an upper portion of the display screen, determining which portions of the piece of content are interesting to the user, ranking the portions of the piece of content based on an interaction of the user with content, determining a selected portion of the ranked portions based on the ranking, and rendering the selected portion of the piece of content within a main portion of the display screen.

9. The computer program product of claim 8 further comprising instructions for:
rendering a graphical divider between the header portion of the piece of content and the selected portion of the piece of content on the display screen.

10. The computer program product of claim 9 wherein the graphical divider simulates a third dimension that extends into the display screen.

11. The computer program product of claim 8 further comprising instructions for:
responsive to a determination that the piece of content will fit within the display screen, rendering the piece of content within the display screen.

12. The computer program product of claim 8 further comprising instructions for:
longitudinally scrolling the selected portion of the piece of content within the main portion of the display screen in response to a scroll indication from the user.

13. The computer program product of claim 12 wherein the header portion of the piece of content remains stationary within the upper portion of the display screen while the selected portion of the piece of content is longitudinally scrolled within the main portion of the display screen.

14. The computer program product of claim 8 wherein the display screen is included within a handheld electronic device.

15. A computing system including a processor and memory configured to perform operations comprising: receiving an indication of a user selecting a piece of content for review on a display screen; determining if the piece of content will fit within the display screen; responsive to a determination that the piece of content will not fit within the display screen, performing: rendering a header portion of the piece of content within an upper portion of the display screen,
determining which portions of the piece of content are interesting to the user, ranking the portions of the piece of content based on an interaction of the user with content, determining a selected portion of the ranked portions based on the ranking, and rendering the selected portion of the piece of content within a main portion of the display screen.

16. The computing system of claim 15 further configured to perform operations comprising:
rendering a graphical divider between the header portion of the piece of content and the selected portion of the piece of content on the display screen.

17. The computing system of claim 16 wherein the graphical divider simulates a third dimension that extends into the display screen.

18. The computing system of claim 15 further configured to perform operations comprising:
responsive to a determination that the piece of content will fit within the display screen, rendering the piece of content within the display screen.

19. The computing system of claim 15 further configured to perform operations comprising:
longitudinally scrolling the selected portion of the piece of content within the main portion of the display screen in response to a scroll indication from the user.

20. The computing system of claim 19 wherein the header portion of the piece of content remains stationary within the upper portion of the display screen while the selected portion of the piece of content is longitudinally scrolled within the main portion of the display screen.

21. The computing system of claim 15 wherein the display screen is included within a handheld electronic device.

\* \* \* \* \*